(12) United States Patent
Filippi et al.

(10) Patent No.: US 8,302,672 B2
(45) Date of Patent: Nov. 6, 2012

(54) PLATE TYPE HEAT EXCHANGER FOR A ISOTHERMAL CHEMICAL REACTOR

(75) Inventors: Ermanno Filippi, Castagnola (CH);
Enrico Rizzi, Casnate Con Bernate (IT);
Mirco Tarozzo, Ligornetto (CH); Luca Zanichelli, Grandola Ed Uniti (IT)

(73) Assignee: Methanol Casale S.A. (CH)

( * ) Notice: Subject to any disclaimer, the term of this patent is extended or adjusted under 35 U.S.C. 154(b) by 1118 days.

(21) Appl. No.: 12/090,336

(22) PCT Filed: Oct. 31, 2006

(86) PCT No.: PCT/EP2006/010443
§ 371 (c)(1),
(2), (4) Date: May 21, 2008

(87) PCT Pub. No.: WO2007/057102
PCT Pub. Date: May 24, 2007

(65) Prior Publication Data
US 2008/0289805 A1    Nov. 27, 2008

(30) Foreign Application Priority Data
Nov. 18, 2005 (EP) .................................. 05025209

(51) Int. Cl.
F28B 1/00 (2006.01)
B01J 8/04 (2006.01)
(52) U.S. Cl. ................... 165/110; 422/647; 165/157
(58) Field of Classification Search .............. 165/110, 165/115, 116, 117, 157; 422/647, 648, 649, 422/198
See application file for complete search history.

(56) References Cited

U.S. PATENT DOCUMENTS

| 3,132,190 | A | * | 5/1964 | Engalitcheff, Jr | 261/30 |
| 3,205,147 | A | * | 9/1965 | Foure et al. | 376/399 |
| 3,475,137 | A | * | 10/1969 | Kuo et al. | 422/148 |
| 3,666,423 | A | * | 5/1972 | Muenger | 422/200 |
| 4,435,339 | A | * | 3/1984 | Kragh | 261/153 |
| 6,455,015 | B1 | * | 9/2002 | Kilroy | 422/606 |
| 7,090,807 | B1 | * | 8/2006 | Brauchle et al. | 422/646 |
| 7,147,048 | B2 | * | 12/2006 | Mitsumoto et al. | 165/159 |
| 7,727,491 | B2 | * | 6/2010 | Filippi et al. | 422/198 |
| 2004/0091403 | A1 | * | 5/2004 | Filippi et al. | 422/198 |
| 2005/0061490 | A1 | | 3/2005 | Filippi et al. | |
| 2006/0140844 | A1 | * | 6/2006 | Filippi et al. | 423/392 |

FOREIGN PATENT DOCUMENTS

| EP | 1236505 A1 | 9/2002 |
| EP | 1350560 A1 | 10/2003 |
| WO | WO 9929621 A1 * | 6/1999 |

* cited by examiner

Primary Examiner — Tho V Duong
(74) Attorney, Agent, or Firm — Akerman Senterfitt

(57) ABSTRACT

Plate type heat exchanger (20,120) for a isothermal chemical reactor (60), of the type comprising a substantially box-shaped flattened body (22), defining an internal chamber (24) and equipped with an inlet connection (28) and an outlet connection (29) for a first flow of a heat exchanger operative fluid into and from said chamber (24), at least one supplying-distributing device (26, 126) of a second fluid flow, associated with said body (22) and in fluid communication with the internal chamber (24) thereof, in order to regulate the temperature of said operative fluid, said at least one supplying-distributing device (26,126) being supported inside said internal chamber (24) and in fluid communication therewith.

12 Claims, 4 Drawing Sheets

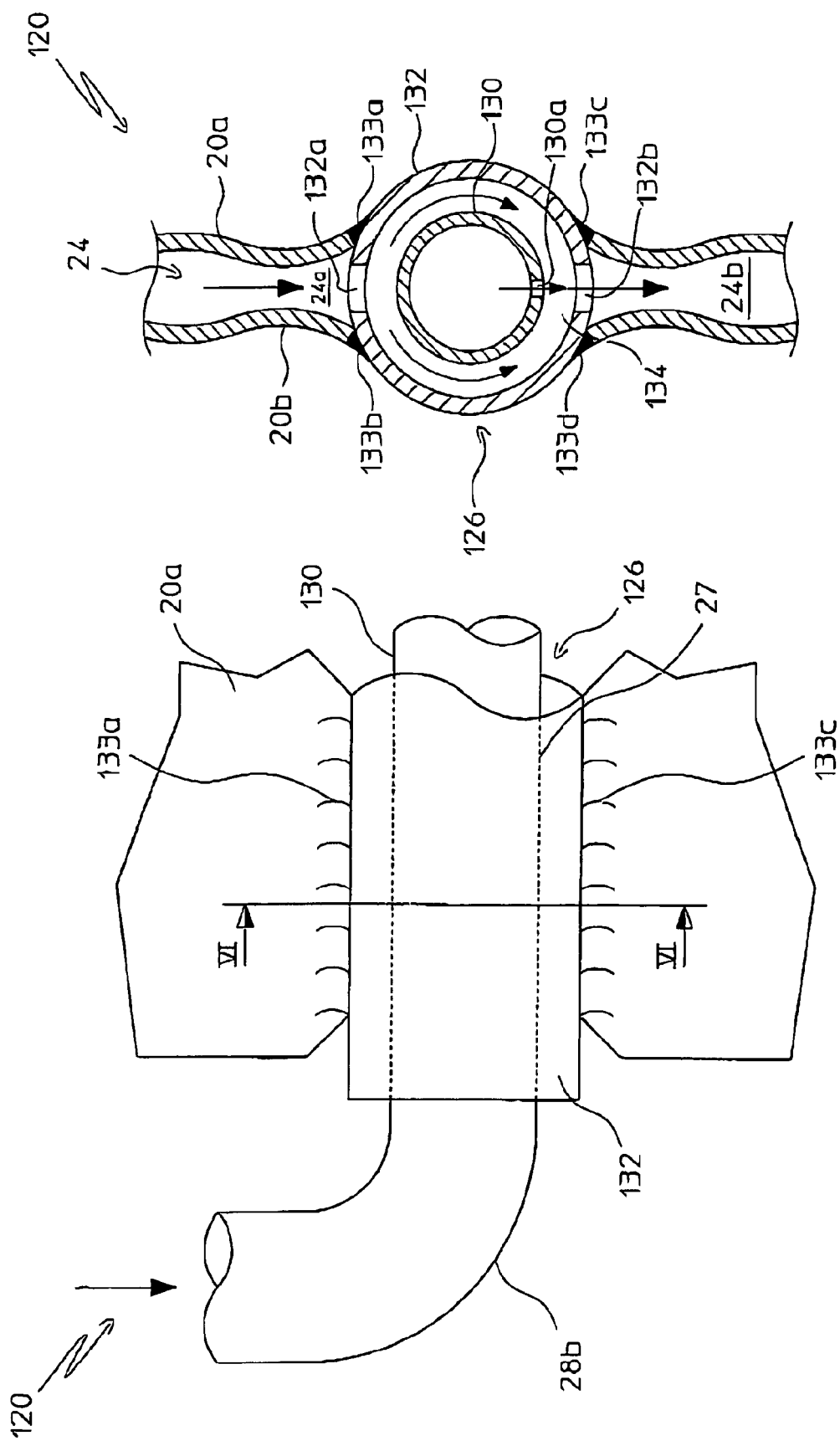

PLATE TYPE HEAT EXCHANGER FOR A ISOTHERMAL CHEMICAL REACTOR

FIELD OF APPLICATION

The present invention relates, in its most general aspect, to a chemical reactor wherein a predetermined chemical reaction is carried out under pseudo-isothermal conditions, i.e. in other words, in conditions where the reaction temperature is controlled within a value range limited in the proximity of a pre-established optimal value, or pre-established temperature curve.

In particular, the present invention relates to a pseudo-isothermal reactor (also referred to as isothermal reactor) of the mentioned type, wherein, a heat exchange unit is used in order to obtain the aforesaid reaction temperature control, comprising a plurality of so-called plate type heat exchangers, destined to be crossed by an appropriate heat exchange operative fluid.

More in particular, the present invention relates to a plate type heat exchanger, structured to permit a control/regulation of the temperature of the heat exchange operative fluid, which crosses it.

Such heat exchanger comprises a substantially box-shaped flattened body, defining an internal chamber and equipped with an inlet and an outlet connection for a first flow of a heat exchange operative fluid into and from said chamber, at least one supplying-distributing device for a second fluid flow associated with said body and in fluid communication with the internal chamber thereof, in order to regulate the temperature of said operative fluid.

PRIOR ART

It is known that in order to carry out chemical reactions in pseudo isothermal conditions, such as for example, synthesis reactions of ammonia, methanol, formaldehyde or styrene, it is necessary to remove or, respectively, to provide heat from/to a reaction environment in which the reactions take place, generally a catalytic bed, so as to control the current reaction temperature within a narrow range around a precalculated theoretical value.

It is also known the use, for this purpose, of a plurality of heat exchangers, arranged in the catalytic bed and internally crossed by an appropriate heat exchange operative fluid.

In particular, plate type heat exchangers are used, having a substantially box-shaped flattened body, defining an internal chamber, destined to be crossed by said operative fluid along an established path between a fluid inlet connection and a fluid outlet connection.

However, in relation to the use of heat exchangers for the required control of pseudo-isothermal conditions, a technical drawback exists based on the fact that the heat exchange operative fluid is necessarily subject to a temperature variation (for example, an increase in the case of exothermic reactions) as the fluid proceeds gradually along the respective path through said heat exchangers. This variation is sometimes considerable, and always results in a reduced operative efficiency of the heat exchangers themselves. Therefore this variation results in a reduced control capacity over the pseudo-isothermal conditions of the chemical reaction in question, and consequently, also in a reduced yield.

In order to overcome this drawback, it has been suggested to control the temperature of the predetermined heat exchange operative fluid along the entire path thereof through the respective heat exchanger, in order to maintain the temperature at a value as close as possible to that of the temperature which said fluid has when it enters the heat exchanger itself.

And with this aim in mind, prior art has proposed supplying into the heat exchanger, and into several points of the fluid path defined therein, a further fluid flow at an appropriate temperature (hereafter also referred to as temperature regulation fluid), with the implicit expedient of mixing the two fluid flows in a manner as uniform as possible. Basically, to perform the aforesaid control, prior art has proposed a "direct" heat exchange, inside each heat exchanger, between the operative fluid and a further regulation fluid, having appropriate and established temperature and flow rate characteristics.

In the case of plate type heat exchangers, the aforesaid technique has been applied by adopting one or more distributors for the predetermined regulation fluid, which are externally welded to a wall of the exchanger, extended substantially over the total width of said wall, in a transversal direction in relation to the flow direction of the operative fluid.

However it has been noted that although this solution presents advantages from various viewpoints, it is susceptible of a improvement, particularly from a structural point of view.

SUMMARY OF THE INVENTION

The technical problem underlying the present invention is that of devising and providing a plate type heat exchanger of the mentioned type having structural and functional characteristics that not only permit an efficient control/regulation of the temperature of the heat exchange operative fluid that crosses the exchanger, but that are also easy to realize, extremely versatile to use, especially in relation to operative pressure, and extremely reliable.

This problem is solved according to the present invention, by a plate type heat exchanger of the aforesaid type, characterized in that said at least one supplying-distributing device is supported inside the said internal chamber and in fluid communication therewith.

Further characteristics and the advantages of the plate type heat exchanger for a isothermal chemical reactor, according to the present invention, will be made clear from the following description of a preferred exemplary embodiment, given for indicating and not limiting purposes with reference to the attached drawings.

BRIEF DESCRIPTION OF THE DRAWINGS

FIG. 5 schematically shows an enlarged elevation view of a detail of a second embodiment of the plate type heat exchanger of FIG. 2.

FIG. 6 schematically shows a cross section view of the detail shown in FIG. 5, taken according to the plane traced with VI-VI in FIG. 5.

DETAILED DESCRIPTION OF A PREFERRED EMBODIMENT

Figure 1:
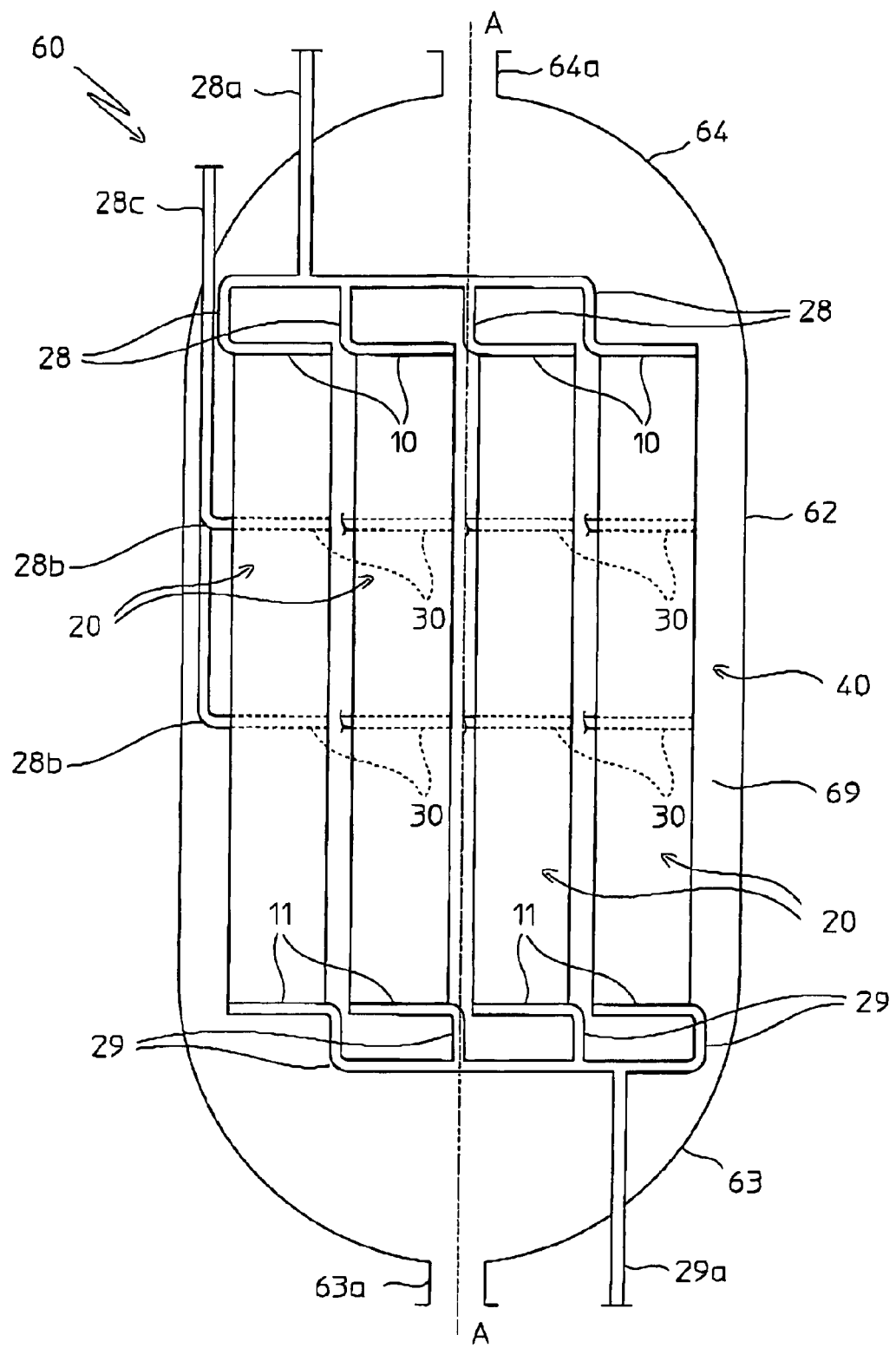
FIG. 1 schematically shows a longitudinal section of a chemical reactor wherein a plurality of plate type heat exchangers are provided according to the present invention.

With reference to FIG. 1, a isothermal chemical reactor 60 conventionally comprises a cylindrical shell 62, having a vertical axis A-A, closed at opposed ends by lower bottom 63, and top bottom 64, respectively. A reaction environment 69 is defined inside the shell 62, and generally comprises a catalytic bed, not shown, in which a heat exchanger unit 40 is supported, in a per se conventional manner.

Said heat exchanger unit 40 comprises a plurality of plate type heat exchangers 20, which can be arranged side by side, for example.

Each plate exchanger 20, has a box-shaped flattened body 22, with parallelepiped, rectangular conformation, with long sides parallel to the A-A axis of said reactor 60, defining an internal chamber 24, destined to be crossed by a first flow of a heat exchange operative fluid.

For this purpose, the heat exchanger 20 comprises an inlet connection 28 and an outlet connection 29 for said heat exchange operative fluid, into and from said internal chamber 24.

More precisely, each plate type heat exchanger 20 is equipped, at two short opposite sides 22a and 22b of said body 22, with a distributor pipe 10, and respectively with a collector pipe 11, in fluid communication, on one hand, with said chamber 24, and, on the other, with the exterior of the heat exchanger itself.

It should be noted that as an alternative, it is also possible to provide only one of the two pipes described above, distributor 10 and collector 11, and that the body 22 can also have a substantially box-shaped form.

It should also be noted that (FIGS. 4-6) each plate type heat exchanger 20 has a body 22 that preferably comprises a couple of metal plates 20a and 20b, juxtaposed and reciprocally united at a pre-established spaced relationship, so that said chamber 24 is defined therebetween.

Each heat exchanger 20 is equipped with at least one supplying-distributing device 26 (in the attached figures two devices are shown) for a second fluid flow (or regulation fluid) which, as will be explained further on in the description, is used to control and regulate the temperature of the first heat exchange fluid as it crosses the heat exchanger itself.

According to the present invention, and with the aim of providing a heat exchanger 20 with good mechanical resistance, said supplying-distributing device 26 has a tubular body and is supported inside the said internal chamber 24, wherein it is extended in a transversal direction in relation to the flow direction of the first flow of heat exchange operative fluid. In the examples illustrated, said flow direction is vertical and, with reference to the axis A-A of the reactor 60, the exchanger 20 is commonly referred to as "axial crossing".

According to a first embodiment, the supplying-distributing device 26 comprises a pipe 30 located inside internal chamber 24. The pipe 30 is supported inside the chamber 24 in a per se conventional manner, and for this reason is not shown in the figures. The pipe is supported for example, by suitable fins that extend in a radial direction externally to the pipe 30 until they are in contact with said internal chamber 24, and in a longitudinal direction for a section of a pre-determined length of said pipe 30. Pipe 30, closed at one end, is in fluid communication, at the opposite end, with an inlet connection 28b of the second fluid flow, connected to a second fluid flow inlet opening 28c.

Figure 2:
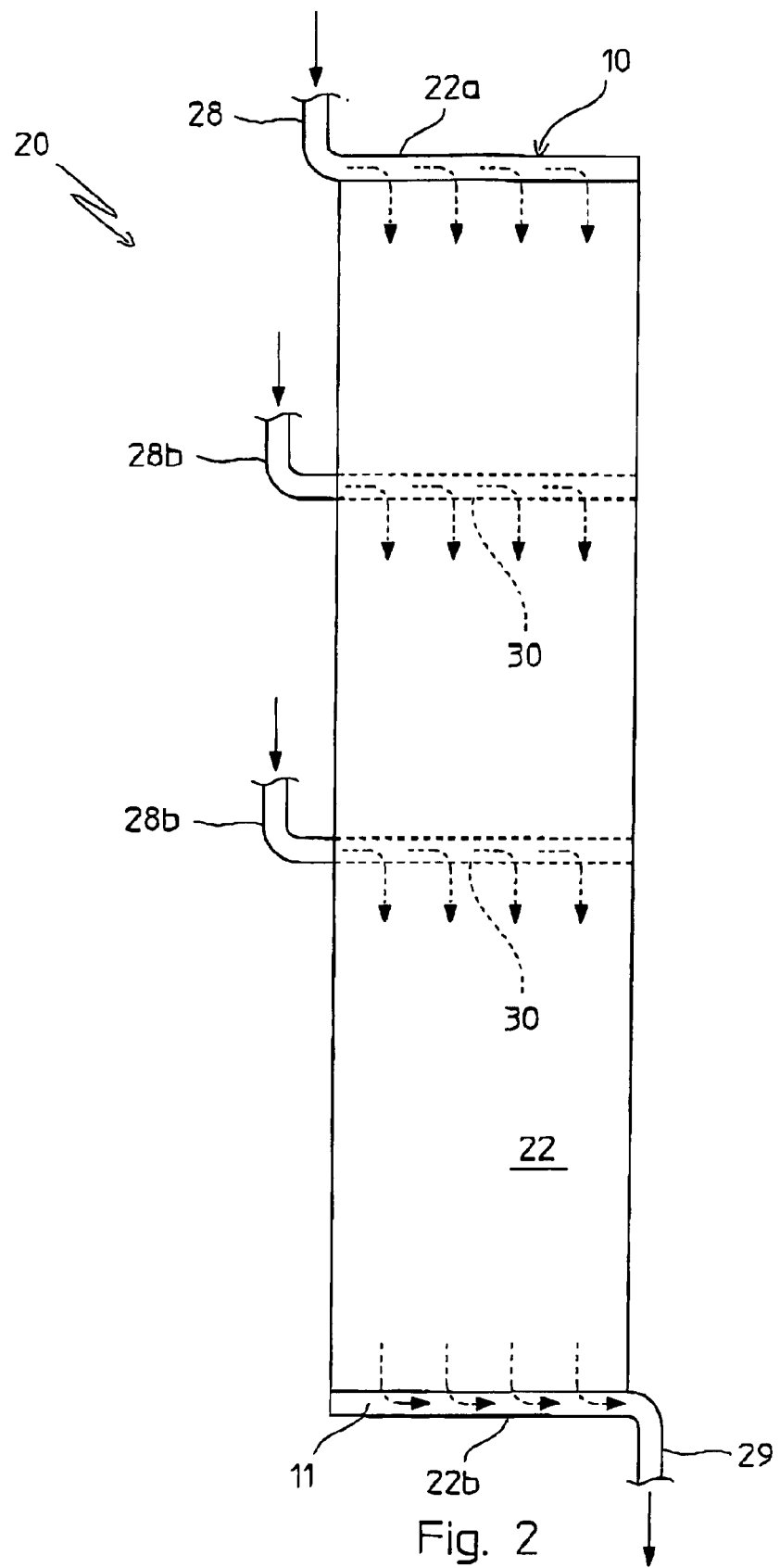
FIG. 2 schematically shows a elevation view of a plate . . . -type heat exchanger comprised in the reactor of FIG. 1.

In the example shown in FIGS. 1 and 2, two pipes 30 are shown in two zones of said chamber 24. The two pipes 30 are connected to respective inlet connections 28b, which are connected to respective inlet openings 28c. Alternatively, a single inlet opening 28c can be provided in fluid communication with the various inlet connections 28b.

On said pipe 30 inlet openings 30a (such as holes) are provided for the inlet of the second fluid flow into said chamber 24, at a pre-established temperature. More precisely, the pipe 30 is positioned parallel to the sides 22a and 22b of the heat exchanger 20, and the inlet openings 30a are arranged along one or more generants of the pipe 30, said generants being preferably directed towards the side 22b of the heat exchanger 20, where the collector pipe 11 is positioned.

Figures 3, 4:
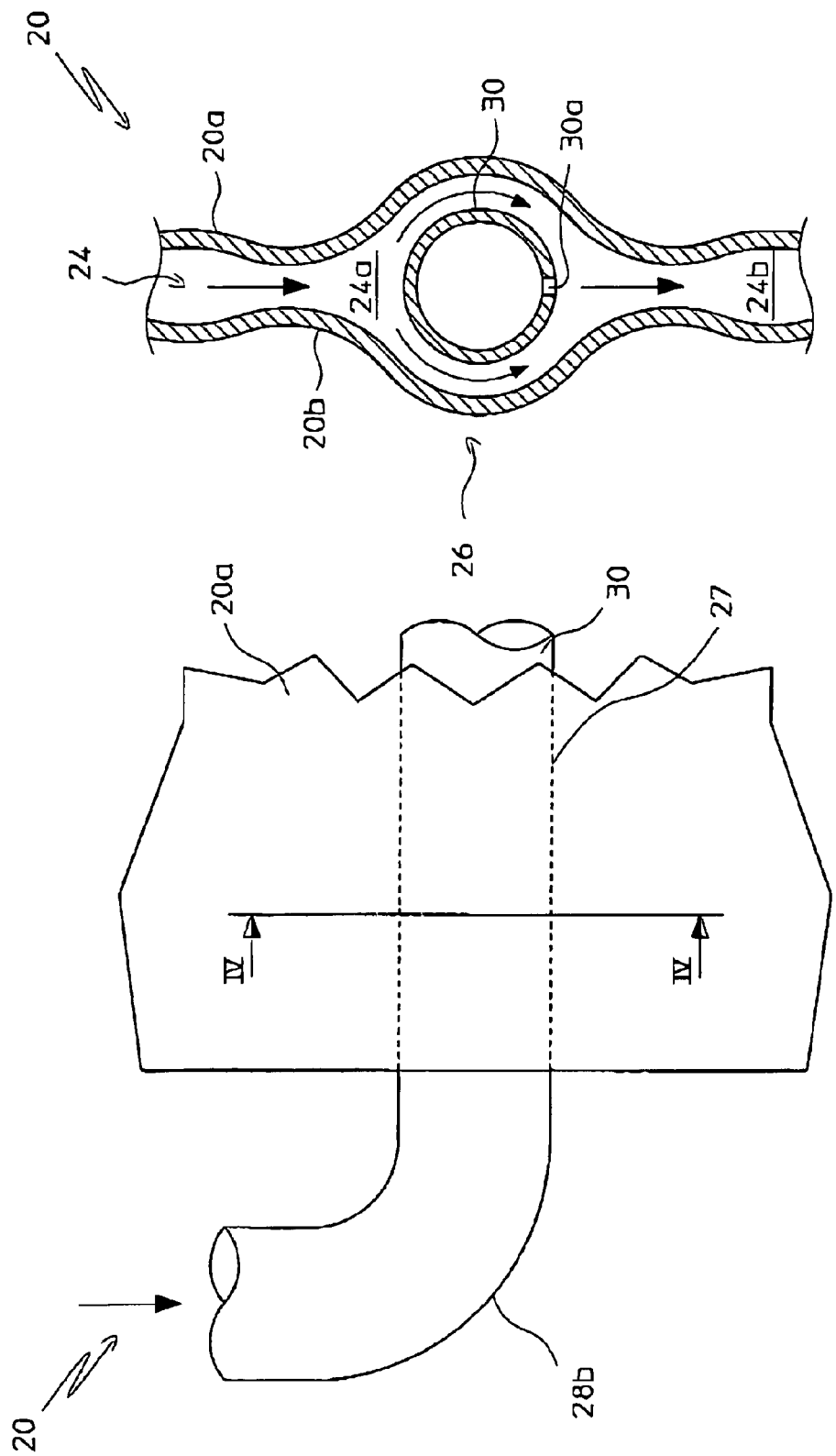
FIG. 3 schematically shows an enlarged elevation view of a detail of a first embodiment of the plate type heat exchanger of FIG. 2.
FIG. 4 schematically shows a cross section view of the detail shown in FIG. 3, taken according to the plane traced with IV-IV in FIG. 3.

As can be seen in FIG. 4, the position of the pipe 30 in the chamber 24 defines a section 24a of the chamber 24 which—in relation to the advancing of the operative fluid in chamber 24—is upstream of the pipe 30, and a section 24b which is downstream of the pipe 30.

The pipe 30 has a smaller size than the cross section of the internal chamber 24, to guarantee the passage, around said pipe 30, of the heat exchange operative fluid from the section 24a of the internal chamber 24, upstream of said pipe 30, to the section 24b downstream of said pipe 30. Preferably, as shown in FIG. 4, the couple of metal plates 20a and 20b will be formed with a suitable bulge at the position in which the pipe 30 is located, in order to be able to house a pipe 30 with a larger size.

Basically, the section 24b of the internal chamber 24 carries the mixture of said first heat exchange operative fluid flow and of said second fluid flow.

In the non-limiting example of an exothermic reaction, a reagent fluid enters the chemical reactor 60 through an inlet opening 64a of the top bottom 64 and reaches the catalytic bed. Here the plurality of plate type heat exchangers 20 absorbs heat, thus assisting the chemical reaction underway in the catalytic bed. The reaction products exit from the reactor through an outlet opening 63a of the lower bottom 63.

Each plate type heat exchanger 20 is supplied with a first heat exchange operative fluid flow, starting from an inlet opening 28a, through the inlet connection 28 and reaching the distributor pipe 10.

More precisely, the first heat exchange operative fluid flow crosses the section 24a of the chamber 24, and is heated until it reaches an established temperature T1.

At the inlet opening 30a of the pipe 30, said first operative fluid flow, at the established temperature T1, is mixed with the second fluid flow, at a predetermined temperature T2 (lower than T1), coming from the inlet openings 30a themselves.

Generally, said operative fluid that crosses the section 24a of the chamber 24, and the fluid that enters through the inlet openings 30a are the same fluid, such as water for example, and therefore at the beginning of the section 24b of chamber 24 there is water that has an intermediate temperature between T1 and T2, and in any case lower than the temperature T1 as it exits from the section 24a of the chamber 24.

In short, at the beginning of section 24b of chamber 24 the operative fluid is cooled, due to the mixing of the hot fluid, arriving from the section 24a of the chamber 24, with the cold fluid, coming from the inlet openings 30a of the pipe 30.

It should be noted that the section 24b of chamber 24 is crossed by a fluid flow rate given by the sum of those of the fluid that crosses the section 24a of chamber 24 and of the fluid that comes from the inlet openings 30a of the pipe 30.

The heat exchange operative fluid that internally crosses the chamber 24 of the heat exchanger 20, is then collected by the collector pipe 11, and, through the outlet connection 29, it reaches a heat exchange operative fluid outlet opening 29a.

FIGS. 5 and 6 show a second embodiment of a plate type heat exchanger according to the present invention which is globally identified by the numeral 120. In FIGS. 5 and 6, structural elements that are identical or equivalent from a functional point of view, to those of the heat exchanger shown in FIGS. 3 and 4, described above, are identified with the same reference numerals and will not be described any further.

The supplying-distributing device, identified by numeral 126, comprises a couple of coaxial and concentric pipes, the internal pipe 130 and the external pipe 132, which define a ring-shaped interspace 134; these are positioned at least at one zone of the said chamber 24 that is situated between said inlet connection 28 and said outlet connection 29. The internal pipe 130 is supported inside the external pipe 132 in a per se conventional manner and therefore is not shown in the drawings, such as, for example, by suitable fins that extend in a radial direction externally to the pipe 130 until they are in contact with the said external pipe 132, and in a longitudinal direction for a section of an established length of said pipe 130. The internal pipe 130, closed at one end, is in fluid communication, at the opposite end, with an inlet connection 28b for the further regulation fluid, connected to an inlet opening for the further regulation fluid (not shown in the figure, but similar to the opening 28c in FIG. 1).

On the internal pipe 130 inlet openings 130a (such as holes) are provided for the inlet of the second fluid flow, at a pre-established temperature, into said interspace 134. More precisely, the pipe 130 is positioned parallel to the sides 22a and 22b of the heat exchanger 120, and the inlet openings 130a are arranged along one or more generants of the pipe 130, said generants being preferably directed towards the side 22b of the heat exchanger 120, where the collector pipe 11 is positioned.

On the external pipe 132 inlet openings 132a (such as holes or slots) are provided for the inlet into said interspace 134 of said first heat exchange fluid operative flow, and outlet openings 132b (such as holes or slots) from said interspace 134 of a mixture of said first heat exchange operative fluid flow and said second fluid flow. More precisely, the inlet openings 132a and outlet openings 132b are arranged along opposite generants of the pipe 132, said generants being respectively directed towards the side 22a of the heat exchanger 120, where the distributor pipe 10 is positioned, and towards the side 22b of the heat exchanger 120, where the collector pipe 11 is positioned.

As shown in FIG. 6, the couple of metal plates 20a and 20b that form the heat exchanger 120, is cut at least at an intermediate position of the heat exchanger 120, in such position being located the external pipe 132. In this way, it is defined the section 24a of the chamber 24, which—in relation to the advancing of the operative fluid in the chamber 24—is positioned upstream of the pipe 132, and section 24b which is downstream of the pipe 132.

In particular, the external pipe 132 is welded along two generants 133a and 133b thereof to the couple of metal plates 20a and 20b which define the section 24a, and along another two generants 133c and 133d thereof to the couple of metal plates 20a and 20b which define the section 24b. More precisely, the generants 133a and 133c are substantially symmetrical with the generants 133b and 133d in relation to the plane of symmetry of the internal chamber 24.

The first heat exchange operative fluid flow crosses the section 24a of the chamber 24 and is heated up to a determined temperature T1. Then, the first operative fluid flow crosses the inlet openings 132a of the pipe 132 and enters the ring-shaped interspace 134.

A mixing of said first operative fluid flow at the determined temperature T1, coming from the inlet openings 132a, with the second fluid flow at a pre-established temperature T2 (lower than T1), coming from the inlet openings 130a, occurs inside said interspace 134, and in particular in a zone of said interspace 134 located between said inlet openings 130a of the pipe 130 and said outlet openings 132b of the pipe 132.

It should be noted that, preferably, said inlet openings 30a, (FIGS. 3 and 4) and, respectively, 130a (FIGS. 5 and 6) are arranged along a supplying-distributing 27 of said second fluid flow, said line 27 transversally extending in relation to the inlet-outlet path of the heat exchanger operative fluid in the chamber 24.

Even more preferably, said second fluid flow is supplied into said internal chamber 24 substantially in the same direction as the path of said first heat exchanger operative fluid flow, starting from the plurality of inlet openings 30a and respectively 130a, forming a plurality of separate and reciprocally spaced points along said supplying-distributing line 27.

Alternatively, said second fluid flow is injected into said first heat exchanger operative fluid flow through said plurality of separate and reciprocally spaced points along said supplying line 27. Thus an advantageous effect is obtained of improved mixing of the second fluid flow in the first operative fluid flow, with the consequential improvement of the heat exchange conditions.

It should be noted that in order to improve the mixing of the second fluid flow in the first operative fluid flow, the inlet openings 30a and 130a are replaced by injection nozzles, aligned and reciprocally spaced to form the said points of the supplying line 27.

The description above makes it very clear that the plate type heat exchanger for a chemical reactor according to the invention solves the technical problem and provides numerous advantages, the first of which being that the heat exchanger is unusually reliable.

Furthermore, the plate type heat exchangers according to the invention are excellently planar, in other words, guaranteeing the symmetry in relation to the median plane of the heat exchanger itself.

In fact, a drawback of the plate type heat exchanger of the prior art, wherein the distributors of the pre-selected regulation fluid are welded externally to only one wall of the heat exchanger, is that this leads to considerable deformation, i.e. is that of becoming curved on the side of the exchanger where the distributor is welded, resulting in problems for appropriate positioning of the exchanger inside the catalytic bed. Such deformation is explained by the fact that by welding the distributor externally on one wall of the exchanger, provokes considerable shrinkage tensions.

On the other hand, the second embodiment of the plate type heat exchanger described above (FIGS. 5 and 6) has four weldings positioned opposite one another, and therefore the respective shrinkage tensions balance each other. The first embodiment of the plate type heat exchanger described above (FIGS. 3 and 4) has no longitudinal weldings, and therefore no shrinkage tensions occur.

Accordingly, as well as being easy to construct and assemble, the heat exchangers according to the invention have practically no unbalanced shrinkage tensions, and result as being stable and strong.

Furthermore, the second embodiment of the plate type heat exchanger (FIGS. 5 and 6), has a mechanical resistance suited to withstand high pressure differences (an example can be found in high pressure chemical reactors—in other words, reactors with a pressure between, for example, 1 bar and 300 bar, the water that flows through the internal chamber of the plate type heat exchangers has a pressure between, for example, 1 bar and 100 bar, and therefore very high pressure differences may exist.)

Yet another advantage of the second embodiment of the aforesaid plate type heat exchanger is that the mixing of the operative fluid with the further fluid in the ring-shaped interspace results as very efficient.

Lastly, it has been surprisingly found that the heat exchange between the heat exchange operative fluid and the reagent fluids is particularly efficient because it was noted that the temperature of the heat exchange operative fluid is maintained within a narrow range: in fact, the walls of the supplying-distributing device, being cooled or heated (according to exothermic or endothermic chemical reactions, respectively) by the second fluid flow, cooperate with said second fluid flow, fed by the supplying-distributing device itself, to cool, or respectively heat, the heat exchange operative fluid.

Obviously, in order to satisfy specific and contingent needs, to the above-described plate type heat exchanger for a isothermal chemical reactor, a person skilled in the art can apply numerous modifications and variants, all of which however remain within the scope of protection of the present invention as defined in the following claims.

The invention claimed is:

1. A plate type heat exchanger for an isothermal chemical reactor, comprising:
   a substantially box-shaped flattened body, defining an internal chamber and equipped with an inlet connection and an outlet connection for a first flow of a heat exchanger operative fluid into and from said chamber; and
   at least one supplying-distributing device of a second fluid flow, associated with said body and in fluid communication with the internal chamber thereof, in order to regulate the temperature of said operative fluid, wherein said at least one supplying-distributing device is supported inside said internal chamber and in fluid communication therewith,
   wherein said at least one supplying-distributing device comprises a couple of coaxial and concentric pipes, internal and external, that define a ring-shaped interspace, wherein inlet openings are provided on said internal pipe into said ring-shaped interspace for said second fluid flow, and wherein inlet openings are provided on said external pipe into said ring-shaped interspace for said first heat exchange operative fluid flow, outlet openings being provided from said ring-shaped interspace for a mixture of said first heat exchange operative fluid and said second fluid flow.

2. The plate type heat exchanger according to claim 1, wherein, at two opposite sides of said body, respectively a distributor pipe, for said first operative fluid flow, and a collector pipe, for said mixture of said first heat exchanger operative fluid flow with said second fluid flow, are provided, said couple of coaxial and concentric pipes being positioned parallel to said two opposite sides of said body.

3. The plate type heat exchanger according to claim 2, wherein said inlet openings of the internal pipe are positioned along one or more generants of said internal pipe.

4. The plate type heat exchanger according to claim 3, wherein said generants are directed towards the side of the body where said collector pipe is positioned.

5. The plate type heat exchanger according to claim 2, wherein said inlet openings and outlet openings of said external pipe are positioned along opposite generants of the external pipe, said generants being respectively directed towards the side of the body where the distributor pipe is positioned, and towards the side of the body where said collector pipe is positioned.

6. The plate type heat exchanger according to claim 1, wherein said body comprises a couple of metal plates juxtaposed and reciprocally united at a pre-established spaced relationship, so that said chamber is defined therebetween, said couple of metal plates being cut at least at one intermediate position of the heat exchanger, wherein said external pipe is located at said position so as to define a first section of the chamber which is upstream of the external pipe and a second section which is downstream of the external pipe.

7. The plate type heat exchanger according to claim 6, wherein the external pipe is welded along a first and a second generant thereof to the couple of metal plates that define said first section, and along a third and a fourth generant thereof to the couple of metal plates that define the second section.

8. The plate type heat exchanger according to claim 7, wherein the first and the third generants are substantially symmetrical with the second and the fourth generants in relation to the plane of symmetry of the internal chamber.

9. A heat exchange unit for an isothermal chemical reactor comprising a plurality of plate type heat exchangers realized according to claim 1.

10. A chemical reactor of the type comprising a cylindrical shell, closed at opposing ends, by respective bottoms, lower and top, inside the shell being defined a reaction environment comprising a catalytic bed wherein a heat exchanger unit is positioned, wherein said heat exchanger unit comprises plate type heat exchangers realized according to claim 1.

11. The heat exchange unit according to claim 9, wherein said body comprises a couple of metal plates juxtaposed and reciprocally united at a pre-established spaced relationship, so that said chamber is defined therebetween, said couple of metal plates being cut at least at one intermediate position of the heat exchanger, wherein said external pipe is located at said position so as to define a first section of the chamber which is upstream of the external pipe and a second section which is downstream of the external pipe.

12. The chemical reactor according to claim 10, wherein said body comprises a couple of metal plates juxtaposed and reciprocally united at a pre-established spaced relationship, so that said chamber is defined therebetween, said couple of metal plates being cut at least at one intermediate position of the heat exchanger, wherein said external pipe is located at said position so as to define a first section of the chamber which is upstream of the external pipe and a second section which is downstream of the external pipe.

* * * * *